(12) United States Patent
Fish et al.

(10) Patent No.: US 6,669,043 B2
(45) Date of Patent: Dec. 30, 2003

(54) PASSTHRU DEVICE FOR INTERNALIZED COMPONENT FUEL TANKS

(75) Inventors: Duane A. Fish, Brighton, MI (US); Rod Kindler, Bloomington, IN (US); Shivaprasad Dhanapal, New Albany, IN (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/965,176

(22) Filed: Sep. 27, 2001

(65) Prior Publication Data

US 2003/0057212 A1 Mar. 27, 2003

(51) Int. Cl.[7] ............................................... B65D 47/04
(52) U.S. Cl. ...................................... 220/4.14; 220/562
(58) Field of Search ................................ 220/562, 4.14, 220/4.13, 729, 86.1, 86.2; 285/901, 124.1

(56) References Cited

U.S. PATENT DOCUMENTS

| 4,651,701 A | * | 3/1987 | Weaver ....................... 123/509 |
| 4,754,993 A | | 7/1988 | Kraynick |
| 4,877,147 A | | 10/1989 | Hyde |
| 5,139,043 A | | 8/1992 | Hyde et al. |
| 5,601,205 A | | 2/1997 | Prechtel et al. |
| 5,951,059 A | | 9/1999 | Kitamura |
| 5,992,441 A | | 11/1999 | Enge et al. ................... 137/202 |
| 6,003,904 A | | 12/1999 | Frohlich et al. |

FOREIGN PATENT DOCUMENTS

| DE | 42 29 717 A1 | 9/1992 | ........... B60K/15/01 |
| DE | 42 29 717 A1 | 3/1994 | |
| DE | 195 35 413 C1 | 9/1995 | ........... F16L/41/08 |
| EP | 0 976 600 A2 | 7/1999 | ........ B60K/15/077 |
| EP | 0 947 368 A2 | 10/1999 | ........... B60K/15/04 |
| EP | 1 084 889 A1 | 3/2001 | ........... B60K/15/03 |
| FR | 2 774 951 | 2/1998 | ......... B60K/15/035 |
| GB | 2 284 581 A | 6/1995 | |
| GB | 2 328 659 A | 3/1999 | ........... B60K/15/03 |

* cited by examiner

Primary Examiner—Stephen Castellano
(74) Attorney, Agent, or Firm—Brinks Hofer Gilson & Lione

(57) ABSTRACT

A pass-through device for internalized component fuel tanks provides passageways for communication between the interior chamber of the fuel tank and the exterior. The pass-through device includes a communicative passageway for a fuel supply line and a through opening for electrical connections, and may include additional communicative passageways for fuel return lines, and purge and fresh air inlets. The pass-through device includes a main body preferably composed of nylon. The main body is bonded to a mounting plate preferably composed of polyethylene. The mounting plate provides a circumferential surface for weldably sealing the pass-through device to a polymeric fuel tank.

15 Claims, 3 Drawing Sheets

PASSTHRU DEVICE FOR INTERNALIZED COMPONENT FUEL TANKS

FIELD OF THE INVENTION

The present invention relates generally to a device that allows various elements to pass through the wall of a vehicle fuel tank and, more particularly, to a pass through device capable of being welded directly onto a wall of a polymeric vehicle fuel tank.

BACKGROUND OF THE INVENTION

Modern automotive fuel tanks commonly have several critical components contained within their interior. For example, many fuel tanks in late-model vehicles typically contain a fuel pump and fuel filter disposed within the interior of the tank. This structure facilitates the modular approach to vehicle assembly currently being advocated by several automobile manufacturers.

The internalization of componentry, however, creates several issues regarding the structure of the fuel tank. For example, necessary communicative elements of the internalized components must pass through the wall of the fuel tank. An electric fuel pump requires an electrical supply line to provide the electricity needed for operation. As a consequence, this line must extend from the energy source, through the wall of the fuel tank, and to the fuel pump. Furthermore, the fuel pump forces fuel out of the tank and to the engine through a fuel supply line. This line must therefore pass from the interior of the fuel tank, through the wall of the tank, and to the engine. Thus, at a minimum, an electrical connection and fuel line must pass through the wall of a fuel tank containing an internalized fuel pump. Depending on the arrangement and properties of the fuel tank and pump, other elements, such as fuel return lines and vapor lines, may also need to pass through the wall of the fuel tank.

Various means exist for providing the necessary conduit through which these communicative elements can pass. For example, some internal fuel pumps have flanges for mounting the base of the pump to a wall of the fuel tank. These flanges are typically secured to the tank via a secondary means of attachment, such as nut and bolt connections or have a threaded base that interacts with a threaded opening in the wall of the fuel tank, sometimes referred to as a Mason jar connection. With the various communicative elements disposed on the underside of the base of the pump, pass-through of the elements is achieved when the fuel pump is secured in place. Due to these secondary means of attachment, fuel pumps employing these technologies typically require the inclusion of a gasket element to ensure a complete seal between the wall of the fuel tank and the fuel pump. Also, the use of such secondary means of attachment typically increases the size of the pass-through portion due to the need to include space for nuts, threads and the like. This larger size necessitates a larger main opening in the fuel tank which provides more opportunity for hydrocarbon permeation.

The seal between any pass-through device and the wall of the tank presents an opportunity for permeation of hydrocarbons through the joint. For example, in a seal utilizing a secondary means of attachment and a gasket, the attachment means may, over time or abruptly, loosen, or the gasket may crack or split. In these situations, the advantages of a modular approach to assembly, e.g., savings of time and expense during manufacturing, may later be defeated by the need for repair or replacement.

It is known in the prior art to use fuel tanks made from polymeric materials, such as polyethylene, in automotive vehicles. These polymeric materials impart various advantageous features onto the fuel tank, including resistance to corrosion, flexibility in design, and decreased overall weight. Devices can be secured to these polymeric fuel tanks in a variety of ways, including via threaded connections and secondary means of attachments, as mentioned above. However, polymeric materials offer another advantage: weldability to similar materials. A weld joint between similar materials avoids the need for secondary means of attachment and provides a strong interface between the two objects.

Considering the above, a pass-through device designed specifically for polymeric fuel tanks will offer several advantages. For example, the device will provide the communicative paths that are necessary for internalized components, while allowing for a stronger joint, i.e., a weld joint, by eliminating the need for a secondary means of attachment. Ultimately, such a device will enhance the operation of internalized component fuel tanks by lessening the opportunity for compromise of the seal between the tank and the pass-through. Also, such a device, appropriately composed, will reduce the ability of hydrocarbons to permeate through the joint between the device and the fuel tank.

SUMMARY OF THE INVENTION

The present invention provides a pass-through device for internalized component vehicle fuel tanks that takes advantage of the polymeric nature of most modern fuel tanks. At a minimum, the pass-through device contains a communicative passageway for the supply fuel line and a through opening for a push-through electrical connector. Also, the pass-through device may contain additional communicative passageway for elements such as fuel return lines and purge and fresh air inlets to a carbon canister.

The pass through device of the present invention comprises three components: a main body made of a barrier type material, such as nylon, a mounting plate of material similar to the material of the fuel tank, and at least one communicative passageway. Preferably, the mounting plate is composed of high density polyethylene. The main body is bonded to the mounting plate and may define the various communicative passageways. The nylon composition of the main body provides a barrier to hydrocarbon emissions, thereby lowering the permeation associated with the joint between the fuel tank and the pass-through device. The mounting plate provides a circumferential surface for weldably connecting the pass-through device to a polymeric fuel tank. This allows the pass-through device to be directly welded to the wall of the fuel tank, providing a superior joint between the pass-through and the fuel tank, and eliminating the need for the use of a secondary means of attachment and/or gasket. As a consequence, the pass-through device can be made relatively smaller than pass-through members that utilize a secondary means of attachment. Therefore, the structure and composition of the pass-through device according to the present invention allows several communicative elements to pass through a relatively smaller opening in the wall of a polymeric fuel tank.

DETAILED DESCRIPTION OF THE INVENTION

Figure 1:
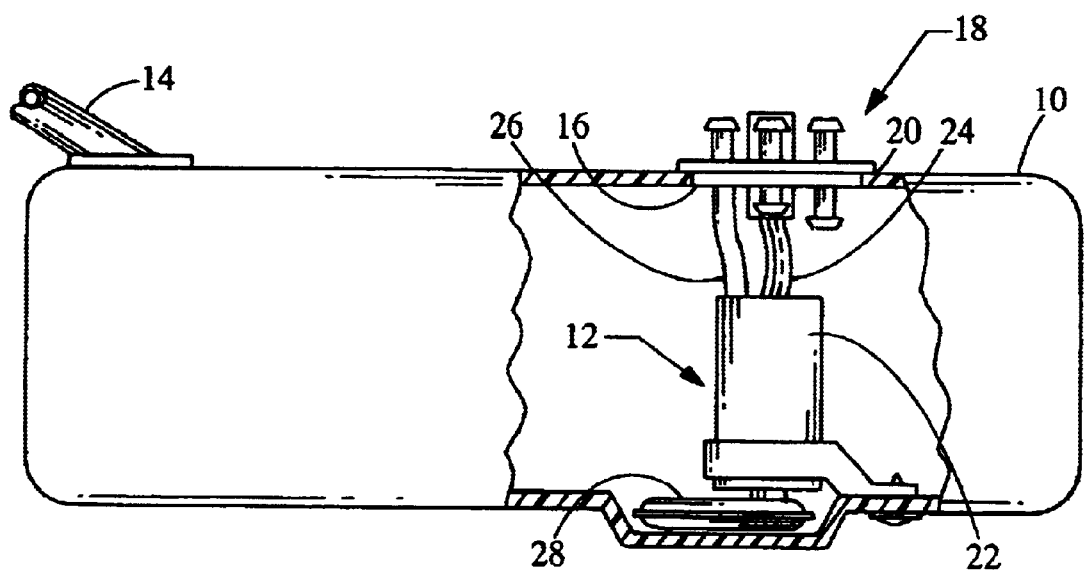
FIG. 1 is a side elevational view of a polymeric motor vehicle fuel tank with a portion broken away to reveal an internalized fuel pump assembly and a pass-through device according to the present invention.

FIG. 1 illustrates a typical polymeric vehicle fuel tank 10 including an internalized fuel pump module 12. The fuel tank 10 is preferably blow molded plastic, and includes an inlet 14 or fill tube for the provision of vehicle fuel into the interior space of the fuel tank 10 from the exterior. The tank defines a main opening 16 for receiving the internalized fuel pump module 12 and any other internalized components. The pass-through device 18 of the present invention closeably seals the main opening 16 of the fuel tank 10 via a circumferential weld joint 20 with the fuel tank 10.

The internalized fuel pump module 12 pumps vehicle fuel from the interior space of the fuel tank 10 to the engine of the vehicle. The fuel pump module 12 includes an electrical fuel pump 22 and an electrical supply line 24 that provides electrical energy from a power source external to the fuel tank 10. Also, the fuel pump module 12 includes a fuel supply line 26 that carries fuel from the fuel pump module 12, away from the fuel tank 10 and to the engine. The fuel pump module 12 may contain a fuel return line (not illustrated) and an associated in-tank fuel filter 28.

Various communicative elements can pass through the wall of the vehicle fuel tank 10. At a minimum, a fuel tank 10 with an internalized fuel pump module 12 has, as indicated above, an electrical supply line 24 and a fuel supply line 26 pass through its wall. If the vehicle does not have a returnless fuel delivery system, a fuel return line carrying excess fuel from the engine to the fuel tank 10 may also pass through the wall of the fuel tank 10. Furthermore, to balance pressure in the interior space of the fuel tank 10 with external pressure, purge and vent ports may be necessary.

The pass through device 18 of the present invention comprises three primary components: a main body 30, a mounting plate 32 and at least one communicative passageway 34. The main body 30 is bonded to the mounting plate 32, forming a circumferential ridge 36 between the two components 30, 32. The main body 30 preferably defines at least one communicative passageway 34 that can take a variety of forms. Alternatively, the main body defines at least one aperture that can receive a separate assembly having one or more communicative passageways.

The main body 30 is preferably comprised of a heat and fuel resistant material. Also, it is preferred that the material serves as a barrier to the hydrocarbons typically found in vehicle fuel. That is, the material of the main body 30 of the pass-through device 18 inhibits the permeation of hydrocarbons. Preferably, the main body 30 is comprised of nylon or other suitable barrier material.

Figure 3:
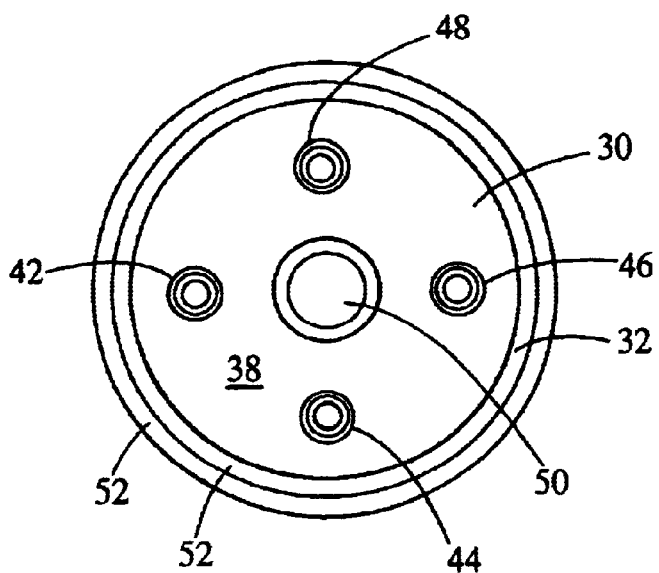
FIG. 3, is a top view of a pass-through device according to the present invention.

As best shown in FIG. 3, the main body 30 is preferably a circular shaped member defining an upper 38 and lower surface 40. FIG. 1 illustrates a preferred size of the pass-through device 18 relative to the main opening 16 of the tank 10. The main body 30 preferably has a diameter slightly smaller than the diameter of the main opening 16 in the fuel tank 10. This allows the main body 30 to float in the main opening 16. The mounting plate 32, as will be further developed below, is slightly larger in size than the main opening 16, and therefore, when secured to the main body 30 and the fuel tank 10, prohibits the main body 30 from complete movement through the main opening 16. While this size and shape is preferred for the main body 30, it will be appreciated that the main body 30 can take on any size and/or shape as appropriate for the main opening 16 of the fuel tank 10 to which the pass-through device 18 is being secured.

The communicative passageway(s) 34, as will be more fully developed below, pass through the entire thickness of the main body 30, extending from the upper surface 38, through the main body 30 and through the lower surface 40. Preferably, the communicative passageway(s) 34 is disposed essentially perpendicular to the upper 38 and lower surfaces 40 of the main body 30. Alternatively, the communicative passageway(s) 34 may extend through the main body 30 at any angle suitable for the particular element being passed through the wall of the vehicle fuel tank 10.

The communicative passageway(s) 34 serve as pass-throughs for individual communicative elements. At a minimum, the communicative passageways 34 preferably includes a fuel supply line port 42 that allows the fuel supply line 26 to pass from the fuel pump 22 through the wall of the fuel tank 10, and toward the engine. Other ports, such as a fuel return line port 44, a vent port 46 and a purge port 48 may also be included. Also, an electrical supply port 50 may be present and allows the electrical supply line 24 of the fuel pump 22 to pass from a power source, through the wall of the vehicle tank 10, and to the fuel pump 22. Furthermore, a separate fuel supply line port 44 may be present that allows additional fuel supply line to pass through the wall of the tank to a device, such as a supplementary generator.

The overall configuration of the communicative passageways 34 defined by the main body 30 will depend on the configuration of the internalized components within the fuel tank 10. In a preferred embodiment illustrated in FIG. 3, the pass-through device 18 contains five communicative passageways 34: a fuel supply line port 42, a fuel return line port 44, a purge port 48, a vent port 46, and an electrical supply port 50. Preferably, the electrical supply port 50 is a centrally disposed, circular opening defined by the main body 30. Also preferably, the remaining ports 42, 44, 46, 48 are arranged around the centrally-located electrical supply port 50. In this configuration, the centers of the fuel supply line port 42, fuel return line port 44, purge port 48 and vent port 46 are located equidistant from each other and from the centrally located electrical supply port 50. This arrangement allows for easy management of the various elements extending above and below the pass-through device 18. Alternatively, of course, all communicative passageway(s) 34 can be arranged in any fashion and pattern on the main body 30.

The communicative passageways 34 are preferably integrally formed by the main body 30. Alternatively, the main body 30 can define a plurality of openings for receiving communicative passageways 34 that constitute separate members or assemblies. In this embodiment, the communicative passageways 34 are disposed within the openings of the main body 30 and fixedly attached thereto by any suitable means, such as welding.

The communicative passageway(s) 34 can take on a variety of forms and sizes, depending on the configuration and size of the various communicative elements that must pass through the wall of the fuel tank 10 in which the pass-through device is being utilized. For example, the electrical supply line port 50 is preferably a push-through connector. This connector comprises a polymer plug molded around electrical conductors for the purpose of supplying electrical energy to internal components of the fuel tank 10 assembly. Also, the fuel supply line port 42 and fuel return line port 44, if present, may include quick connect features on one or both sides of the main body to facilitate rapid connection and disconnection of fuel supply and return lines. These connections preferably conform to SAE J405 specifications for fuel line disconnects. Other forms that the communicative passageways 34 can take include simple barbed projections for retaining a tube or hose, threaded openings and/or projections, or any other suitable form.

Preferably, the mounting plate 32 is composed of the same polymeric material used to form the vehicle fuel tank 10. This correlation of materials assures that a strong weld joint is created between the mounting plate 32 and the fuel tank 10. Due to the prevalence of polyethylene as a material used in the manufacturing of blow-molded vehicle fuel tanks, it is preferred that the mounting plate 32 is formed of polyethylene. It will be appreciated that the mounting plate 32 can be comprised of any polymeric material or mixture of polymeric materials that will allow for creation of a weld joint between the mounting plate 32 and a polymeric vehicle fuel tank 10. Alternatively, the mounting plate 32 can be comprised of any suitable material.

Figure 2:
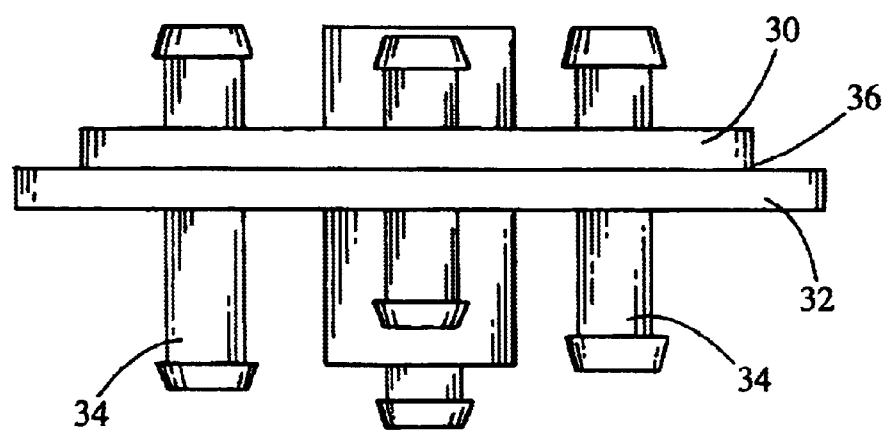
FIG. 2, is an elevational view of a pass-through device according to the present invention.

The mounting plate 32 is preferably a circular member. It will be appreciated by those skilled in the art, however, that any shape suitable for providing the necessary base for the main body 30 and having the necessary shape and surface onto which a weld joint with the fuel tank 10 can be formed will suffice. As best illustrated in FIGS. 2 and 3, the mounting plate 32 preferably defines a flat circumferential ridge 36 around its outer perimeter when associated with the main body 30 of the pass-through device 18. Preferably, the mounting plate 32 is a flat circular member having a diameter slightly larger than the diameter of the main opening 16 in the vehicle fuel tank 10. When bonded together, the mounting plate 32 forms the circumferential ridge 36 with the main body 30.

Alternatively, as depicted in FIG. 3, the mounting plate can be a circular member that defines a plurality of progressively larger shoulders 52 on its outer perimeter. This embodiment allows the pass-through device 18 to have several progressively larger shoulders 52 available for the weld joint. This configuration will enable the pass-through device 18 to be useful in a variety of vehicle fuel tanks having main openings of varying sizes. In this embodiment, the mounting plate 32 still forms the circumferential ridge 36 with the main body 30.

Figure 4:
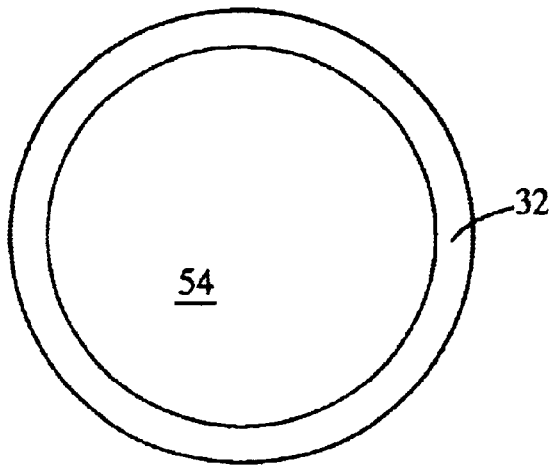
FIG. 4 is a schematic of a ring-shaped mounting plate according to the present invention.
Figure 5:
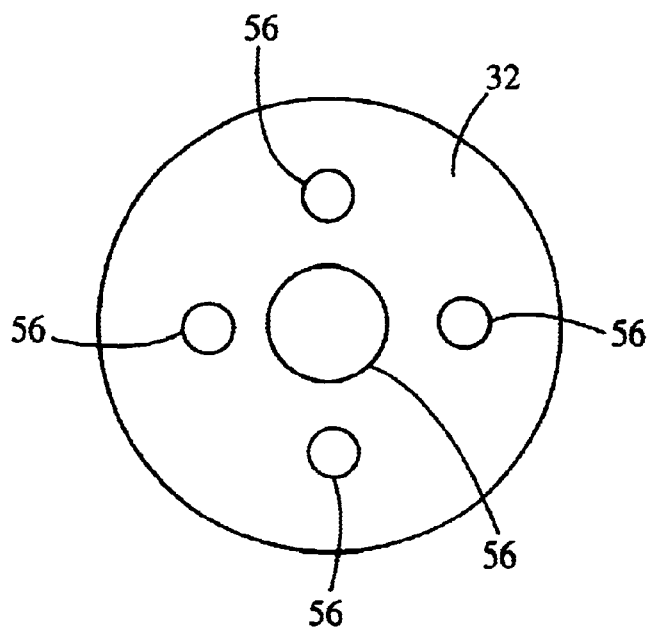
FIG. 5 is a schematic of a circular-shaped mounting plate having a plurality of openings that correspond to the communicative passageways of the main body in accordance with the present invention.

As shown in FIG. 4, the mounting plate 32 can be a ring-shaped member. In this configuration, the mounting plate 32 defines an inner hole 54 that allows the communicative passageway(s) 34 to pass through the hole 54. Alternatively, as illustrated in FIG. 5, the mounting plate 32 can define a plurality of openings 56 that correspond in location and size to the communicative passageway(s) 34 of the main body 30. In this configuration, the communicative passageway(s) 34 are simply passed through the respective openings 56 in the mounting plate 32, and the mounting plate 32 is then bonded to the main body 30.

Figure 6:
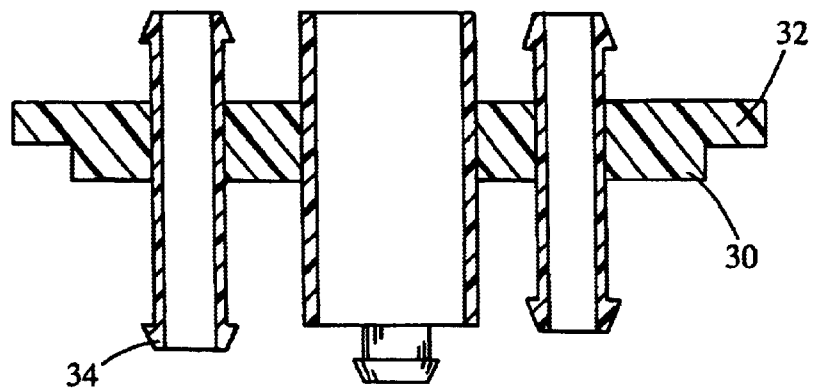
FIG. 6 is an elevational view of a pass-through device including a mounting plate capped onto the main body in accordance with the present invention.
Figure 6A:
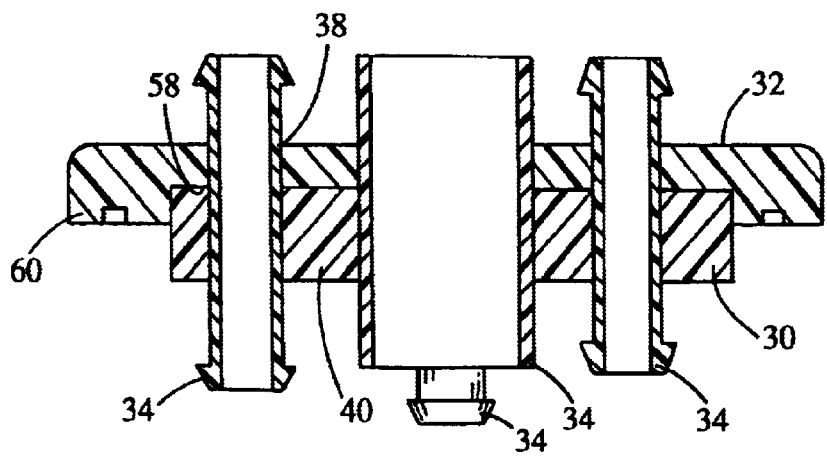
FIG. 6a is an enlarged view of the interaction between the mounting plate and main body of the pass-through device of FIG. 6.
Figure 6B:
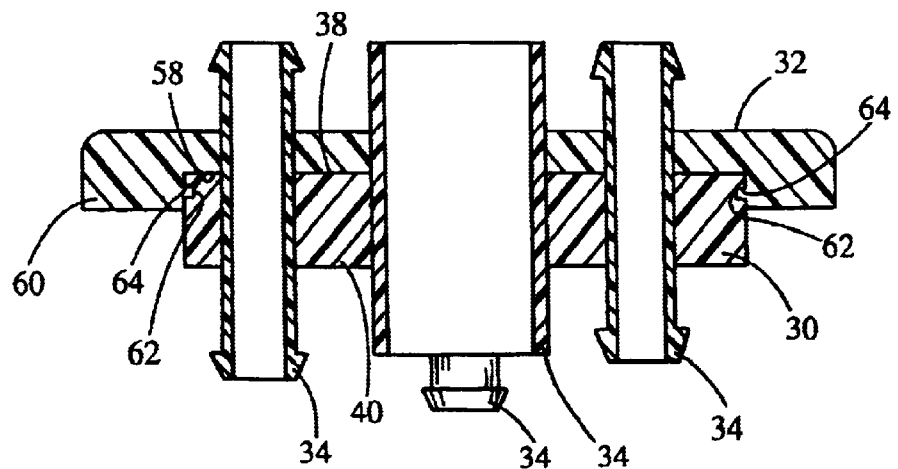
FIG. 6b is an enlarged view of the mounting plate and main body of the pass-through device of FIG. 6, showing structural features of the two components in accordance with the present invention.

As illustrated in FIG. 2, the mounting plate 32 can define a flat, continuous surface for bonding to the main body 30. In this configuration, the mounting plate 32 simply sits adjacent the main body 30, and a bond is formed between the adjacent surfaces of the two components 30, 32. Alternatively, as depicted in FIG. 6, the mounting plate 32 can be integrated with the main body 30. Also alternatively, as illustrated in FIGS. 6A and 6B, the mounting plate 32 can define a recess that receives a surface of the main body 30. The recess 58 is deep enough to accommodate at least a portion of the overall height of the main body 30. Also, in this embodiment, the mounting plate 32 defines a circumferential cap 60 that extends beyond the depth of the recess 58 and assists in retaining the main body 30 adjacent the mounting plate 32 by compressive force. As shown in FIG. 6B, the cap 60 may define locking or retaining means, such as a lip 62 or plurality of lips, that interact with corresponding features, such as a groove 64, on the edge of the main body 30. In this configuration, the cap 60 may be used as the sole means for maintaining the mounting plate 32 adjacent the main body 30, or the mounting plate 32 can be bonded to the main body 30 on the junction areas between the recess 58 and the mounting plate 32 and/or between the caps 60 and the perimeter of the main body 30.

A weld is preferably formed between the circumferential ridge and the surface of the vehicle fuel tank 10 while the pass-through device is situated in the main opening of the vehicle fuel tank 10. The weld provides a seal between the vehicle fuel tank 10 and the pass-through device.

The foregoing disclosure is the best mode devised by the inventors for practicing the invention. It is apparent, however, that pass through devices for internalized component fuel tanks incorporating modifications and variations may be conceivable to one skilled in the art of vehicle fuel tanks and their components. Inasmuch as the foregoing disclosure is intended to enable one skilled in the pertinent art to practice the instant invention, it should not be construed to be limited thereby but should be construed to include such aforementioned variations and be limited only by the spirit and scope of the following claims:

We claim:

1. A pass-through device for a polymeric fuel tank having internalized components accessible through a main opening, the pass-through device comprising:

a main body having an upper surface and a lower surface said main body having an outer diameter smaller than the diameter of said main opening;

a mounting plate comprising a circular member defining a plurality of openings, a recess and a circumferential cap, the mounting plate having an outer diameter larger than said diameter of said main opening, a portion of the mounting plate extending beyond the outer diameter of said main body to define a circumferential ridge in conjunction with said main body;

said main body further defining an axially extending raised portion sized to fit within said recess, said raised portion having a groove and said circumferential cap defining at least one projecting lip, said groove and said projecting lip interacting to retain said mounting plate adjacent said main body; and at least one communicative passageway extending from said upper surface, completely through said main body and said mounting plate;

whereby said pass-through device can be secured to the polymeric fuel tank by welding around said circumferential ridge.

2. The pass-through device of claim 1, wherein said main body is composed of nylon.

3. The pass-through device of claim 1, wherein said mounting plate is composed of the same polymer as said fuel tank.

4. The pass-through device of claim 1, wherein said communicative passageway is integrally formed by said main body.

5. The pass-through device of claim 1, wherein said main body further defines at least one opening and said communicative passageway comprises a separate conduit member disposed within said at least one opening and fixedly attached to said main body.

6. The pass-through device of claim 1, wherein said at least one communicative passageway is a fuel supply line port.

7. The pass-through device of claim 1, wherein at least one end of said communicative passageway defines quick connect features.

8. The pass-through device of claim 1, wherein said circumferential ridge extends along the fuel tank beginning immediately adjacent the main opening.

9. The pass-through device of claim 1, wherein the main body extends at least partially into the main opening and is sized to float within the main opening.

10. The pass-through device of claim 1, wherein the outer perimeter of said mounting plate is stepped to define a plurality of shoulders for attaching the pass-through device to different sized openings.

11. A pass-through device for a polymeric fuel tank having internalized components, the pass-through device comprising:

a main body having an upper surface and a lower surface and defining a fuel supply line port and an electrical supply line port;

a mounting plate comprising a circular member defining an axially opening recess and a circumferential cap, the mounting plate connected to said main body and extending beyond said main body to define a circumferential ridge;

said main body further defining an axially extending raised portion sized to fit within said recess, said raised portion having a groove and said circumferential cap defining at least one projecting lip, said groove and said projecting lip interacting to retain said mounting plate adjacent said main body;

said main body and said mounting plate having a corresponding plurality of openings that define an electrical supply line port, a fuel supply line port and a fuel return line port, said electrical supply line port being centrally located within said main body and mounting plate, said fuel supply line port and said fuel return line port being radially spaced from said electrical supply line port and;

whereby said pass-through device can be secured to the polymeric fuel tank by welding around said circumferential ridge.

12. The pass-through device of claim 11, wherein said electrical supply port comprises a push-through connector.

13. The pass-through device of claim 11, wherein said corresponding plurality of openings in said mounting plate and said main body further define a purge port and a vent port radially spaced from the electrical supply line port.

14. The pass-through device of claim 13, wherein said fuel supply line port, fuel return line port, purge port and vent port are sequentially arranged around said centrally located electrical supply line port.

15. The pass-through device of claim 13, where said fuel supply line port, fuel return line port, purge port and vent port are smaller than the electrical supply line port.

* * * * *